United States Patent
Sato

(10) Patent No.: US 10,057,315 B2
(45) Date of Patent: Aug. 21, 2018

(54) COMMUNICATION SUPPORT SYSTEM, INFORMATION PROCESSING APPARATUS, CONTROL METHOD, AND STORAGE MEDIUM THAT DISPLAY AN OUTPUT IMAGE OBTAINED BY SUPERPOSING A REFERENCE IMAGE OVER A CAPTURED IMAGE

(71) Applicant: CANON KABUSHIKI KAISHA, Tokyo (JP)

(72) Inventor: Hirochika Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 15/096,424

(22) Filed: Apr. 12, 2016

(65) Prior Publication Data
US 2016/0307349 A1    Oct. 20, 2016

(30) Foreign Application Priority Data
Apr. 15, 2015    (JP) .................... 2015-083323

(51) Int. Cl.
*G06T 11/60*    (2006.01)
*H04L 29/06*    (2006.01)
(Continued)

(52) U.S. Cl.
CPC ............ *H04L 65/601* (2013.01); *G09G 3/001* (2013.01); *G09G 5/026* (2013.01); *G09G 5/14* (2013.01);
(Continued)

(58) Field of Classification Search
CPC ....... G06T 11/60; G06T 3/4038; G09G 5/377; G06F 15/16
See application file for complete search history.

(56) References Cited

U.S. PATENT DOCUMENTS 6,353,450 B1 * 3/2002 DeLeeuw ............. G06F 3/0481
345/623
8,294,823 B2 * 10/2012 Ciudad .................. H04N 7/147
348/14.08
(Continued)

FOREIGN PATENT DOCUMENTS

EP    2399263    * 10/2010 ............. G06F 15/16
ES    2399263 A1    3/2013

*Primary Examiner* — Phi Hoang
(74) *Attorney, Agent, or Firm* — Fitzpatrick, Cella, Harper & Scinto

(57) ABSTRACT

A communication support system includes a network interface configured to receive, via a network, a captured image obtained in another location, a display configured to display the captured image received by the network interface, a cropping unit configured, in a case when the display superposes and displays a reference image as an upper layer over the captured image, to crop an image of an area having the reference image arranged therein out of the captured image, a specifying unit configured to specify a person area corresponding to a person within a cropped image obtained by the cropping unit, and a processing unit configured to make an area that is different from the person area specified by the specifying unit transparent in the cropped image. The display displays an output image obtained by superposing the reference image as an upper layer over the captured image and further superposing the cropped image processed by the processing unit as an upper layer over the reference image.

10 Claims, 11 Drawing Sheets

(51) Int. Cl.
*G09G 5/14* (2006.01)
*G09G 5/377* (2006.01)
*G09G 5/02* (2006.01)
*G09G 3/00* (2006.01)

(52) U.S. Cl.
CPC .......... *G09G 5/377* (2013.01); *G06T 2210/62* (2013.01); *G09G 2340/04* (2013.01); *G09G 2340/12* (2013.01); *G09G 2340/14* (2013.01)

(56) References Cited

U.S. PATENT DOCUMENTS

| | | | | |
|---|---|---|---|---|
| 9,183,560 B2* | 11/2015 | Abelow | ............... | G06Q 10/067 |
| 9,460,340 B2* | 10/2016 | Kauffmann | ......... | G06K 9/00362 |
| 9,628,722 B2* | 4/2017 | Do | .................. | H04N 5/272 |
| 2006/0170693 A1* | 8/2006 | Bethune | .................. | G06T 3/40 |
| | | | | 345/568 |
| 2015/0029294 A1* | 1/2015 | Lin | .................. | H04N 7/141 |
| | | | | 348/14.01 |
| 2015/0205451 A1* | 7/2015 | Lee | .................. | G06F 3/0481 |
| | | | | 715/766 |

* cited by examiner

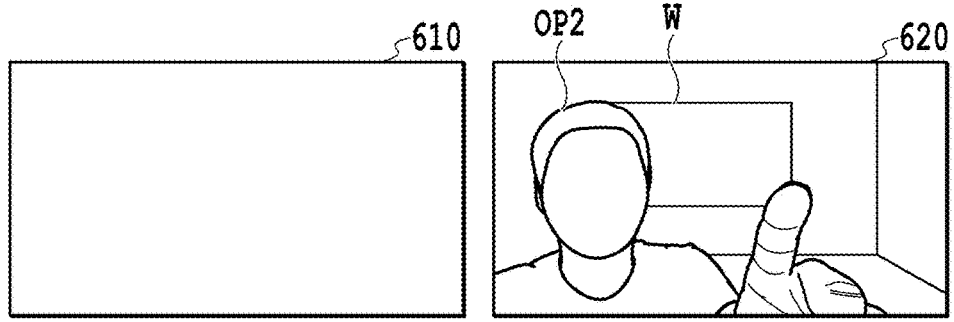
FIG.6A      FIG.6B
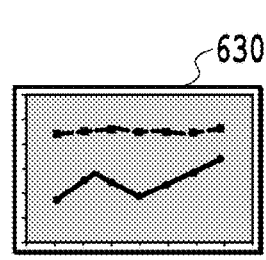    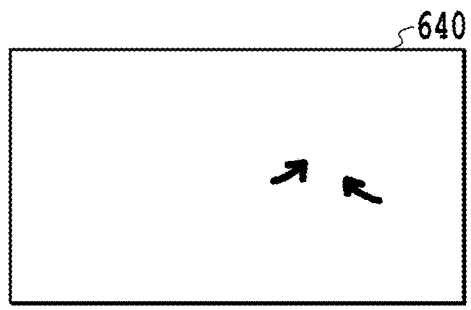
FIG.6C      FIG.6D
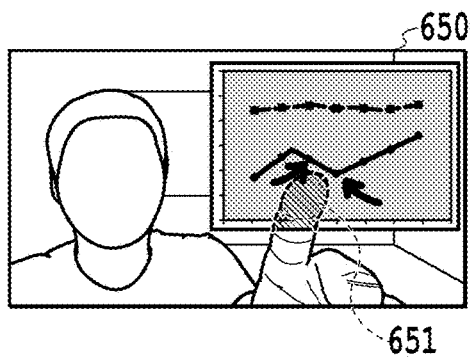
FIG.6E

COMMUNICATION SUPPORT SYSTEM, INFORMATION PROCESSING APPARATUS, CONTROL METHOD, AND STORAGE MEDIUM THAT DISPLAY AN OUTPUT IMAGE OBTAINED BY SUPERPOSING A REFERENCE IMAGE OVER A CAPTURED IMAGE

CLAIM OF PRIORITY

This application claims the benefit of Japanese Patent Application No. 2015-083323, filed Apr. 15, 2015, which is hereby incorporated by reference herein in its entirety.

BACKGROUND OF THE INVENTION

Field of the Invention

The present invention relates to a system for supporting communications between users, in which communication terminals installed in physically separate locations share, via a network, a captured image obtained in each location and a reference image that is referenced by the users.

Description of the Related Art

Traditionally, there are communication support systems that provide a virtual environment in which users in physically separate locations are as if they are facing each other across a pane of glass.

Examples of the communication support systems include the one disclosed in Spanish Patent No. 2399263 (ES2399263, B1). The communication support system disclosed in Spanish Patent No. 2399263 (ES2399263, B1) has a communication terminal that communicates with another communication terminal in another location and a camera that captures an image of an operator in front of a translucent screen from the back of the translucent screen. One communication terminal transmits an image captured by a camera to another communication terminal in another location and also receives an image captured by a camera from the other communication terminal in the other location. The communication terminal performs mirror-imaging processing on the received captured image and projects it on the translucent screen by using a projector.

The communication terminals in different locations share a reference image that is referenced by operators in the different locations, and each communication terminal superposes and displays the captured image received from another location and the reference image, so that the operators in the different locations can perform communications. Further, a detection device is provided near the translucent screen, and in a case when the operator performs a touch action, or the like, on the translucent screen, the communication terminal generates a trajectory image based on detected positional information. The communication terminals in the different locations further share the trajectory image, so that the operators in the different locations can communicate with each other while referring to text written to the reference image and pointing to a specific portion of the reference image.

In such a communication support system, it is needed to ensure both visibility of an operation of an operator included in the captured image and visibility of a content included in the reference image. This is because, in a case when both the visibility of the operation and the visibility of the content are not ensured, the operators in the different locations may not be able to perform accurate communication.

FIG. 1A shows an exemplary screen display in which visibility of an operation by an operator is lost in a conventional communication support system. In the display example shown in FIG. 1A, an operator OP is pointing to a content included in a reference image REF. At this time, a finger and a hand of the operator OP are hidden behind the reference image REF, and it cannot be viewed which content is pointed to by the operator OP.

FIG. 1B shows an exemplary screen display in which visibility of a content is lost in the conventional communication support system. In the display example shown in FIG. 1B, the operator OP is pointing to a content included in the reference image REF. At this time, in a case when the reference image is made translucent to ensure visibility of the operation, visibility of the content is lost due to a background color and a color of clothes of the operator OP. In the example shown in FIG. 1B, a line graph is shown as the content of the reference image REF. Since the reference image REF is translucent, a window W that is part of the background is displayed translucently. As a result, the window W that is part of the background, and the line graph, are displayed in an overlapping manner, causing a loss of visibility of the line graph.

SUMMARY OF THE INVENTION

As stated above, visibility of the content or visibility of the operation by the operator is lost in the conventional communication support system, and it is difficult to perform accurate communication between operators in different locations.

In one aspect, therefore, the present invention provides a communication support system comprising a receiving unit configured to receive, via a network, a captured image obtained in another location, a display unit configured to display the captured image received by the receiving unit. a cropping unit configured, in a case when the display unit superposes and displays a reference image as an upper layer over the captured image, to crop an image of an area having the reference image arranged therein out of the captured image, a specifying unit configured to specify a person area corresponding to a person within a cropped image obtained by the cropping unit. and a processing unit configured to make an area that is different from the person area specified by the specifying unit transparent in the cropped image, wherein the display unit displays an output image obtained by superposing the reference image as an upper layer over the captured image and further superposing the cropped image processed by the processing unit as an upper layer over the reference image.

Further features of the present invention will become apparent from the following description of exemplary embodiments (with reference to the attached drawings).

BRIEF DESCRIPTION OF THE DRAWINGS

FIG. 6A shows an example of a desktop image according to the embodiment;

FIG. 6B shows an example of a captured image according to the embodiment;

FIG. 6C shows an example of a reference image according to the embodiment;

FIG. 6D shows an example of a trajectory image according to the embodiment;

FIG. 6E shows an example of an output image according to the embodiment;

DESCRIPTION OF THE EMBODIMENTS

Embodiments for carrying out the present invention will be described with reference to the attached drawings. However, elements described in the embodiments are only exemplary and are not intended to limit the scope of the present invention.

First Embodiment

Figure 1A:
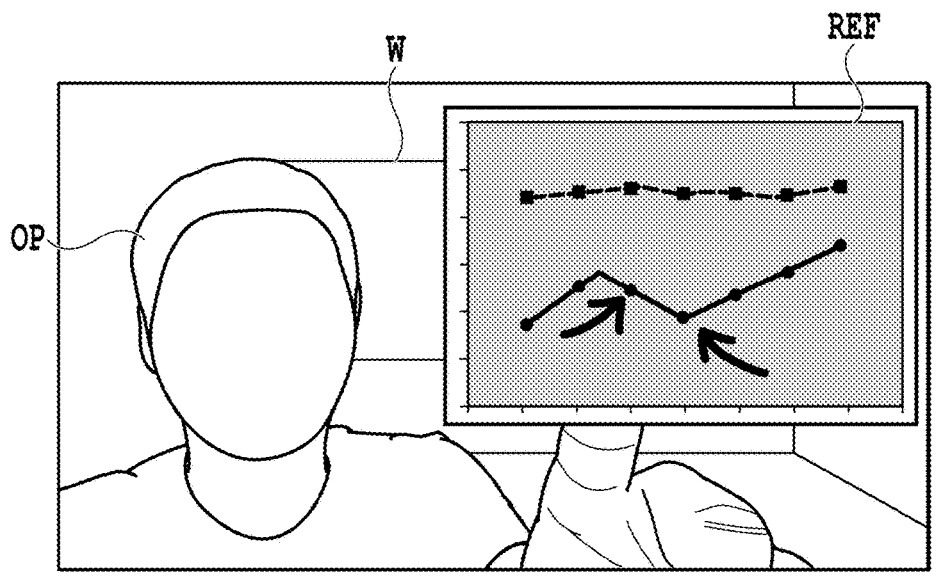
FIG. 1A shows an exemplary screen display in which visibility of an operation by an operator is lost in a conventional communication support system.
Figure 1B:
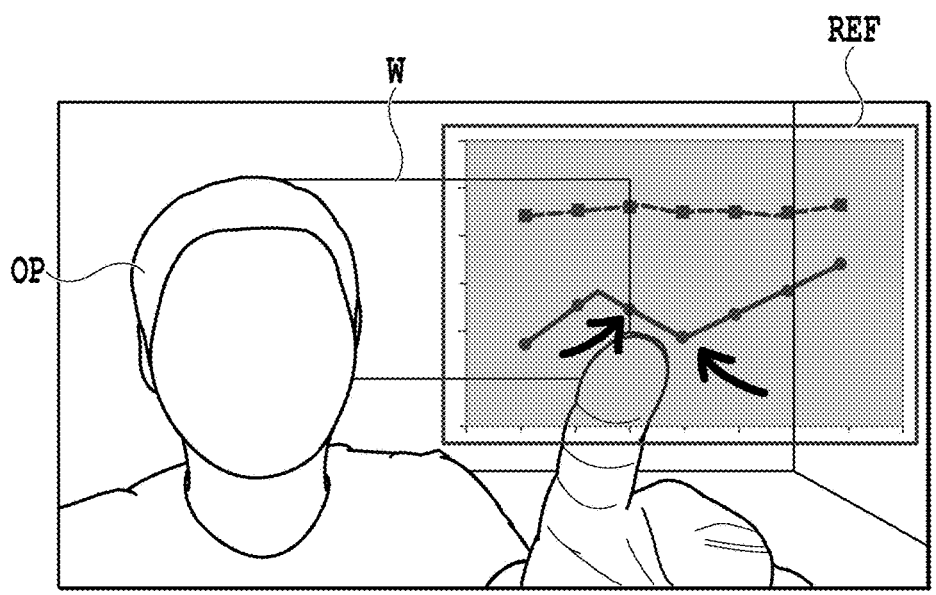
FIG. 1B shows an exemplary screen display in which visibility of a content is lost in the conventional communication support system.
Figure 2:
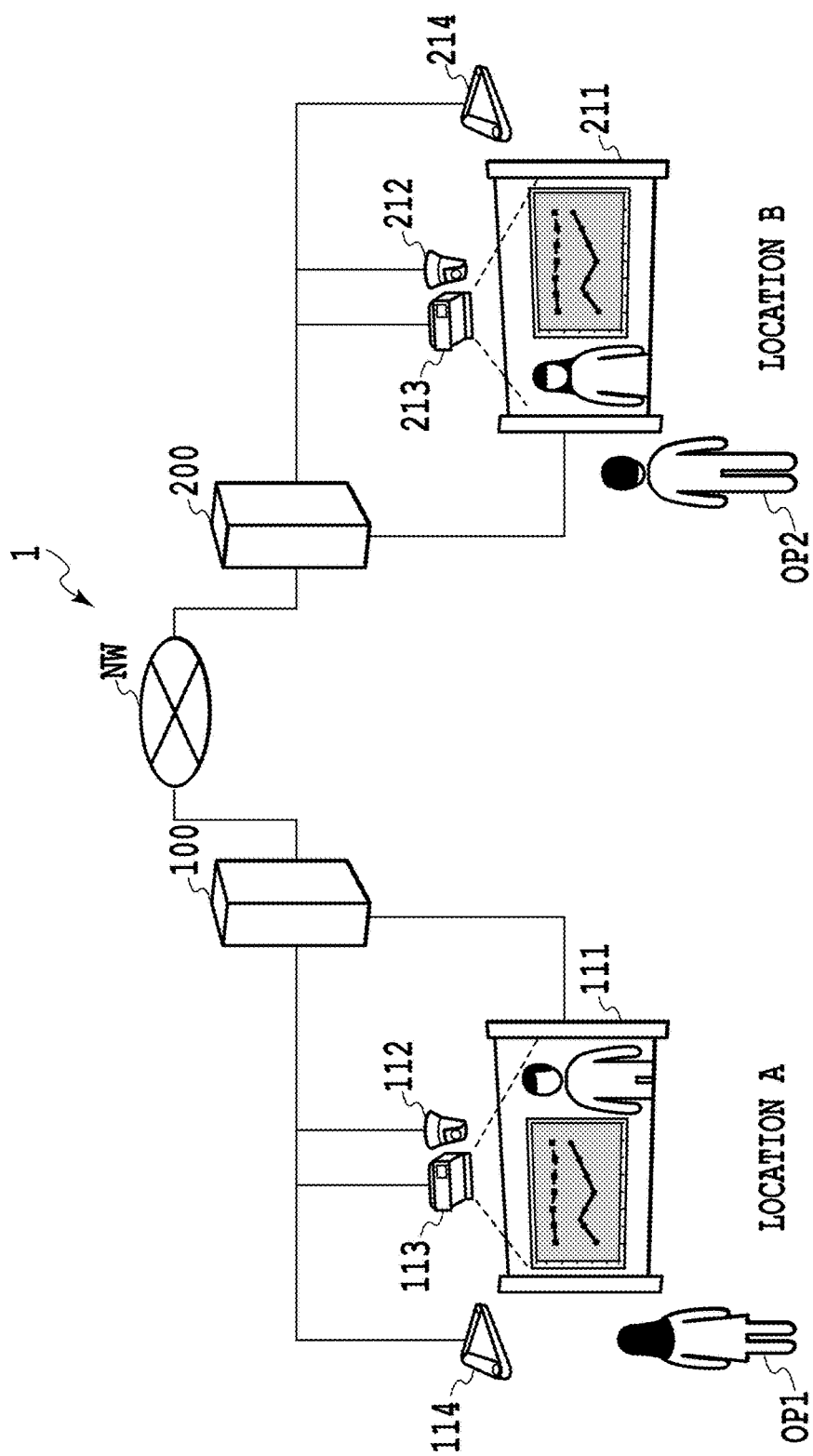
FIG. 2 is a view showing an example of an entire configuration of a communication support system according to an embodiment.

FIG. 2 is a view showing an example of an entire configuration of a communication support system 1 according to the present embodiment. The communication support system 1 includes a communication terminal installed in each location and peripheral devices, and the communication terminals in different locations are communicatively connected to each other via a network. For example, a communication terminal 100 installed in a location A is communicatively connected to the peripheral devices, such as a translucent screen 111, a camera 112, a projector 113, and a microphone speaker 114 via an interface (hereafter referred to as an "I/F").

Also, in a location B, a communication terminal 200 and peripheral devices are configured in the same manner. Unless otherwise specified in the present specification, a description will be given on an assumption that the communication terminal 200 and the peripheral devices are configured in the same manner as those in the location A. It should be noted that, in the present embodiment, a description will be given of an aspect in which the communication terminal 100 and the peripheral devices are connected via the I/F, but the present embodiment should not be limited to this. The communication terminal 100 may include the peripheral devices. In this case, the communication terminal 100 may be achieved as integrated hardware such as a tablet.

Such a communication terminal 100 may be regarded as an information processing apparatus constituting the communication support system 1.

Figure 3:
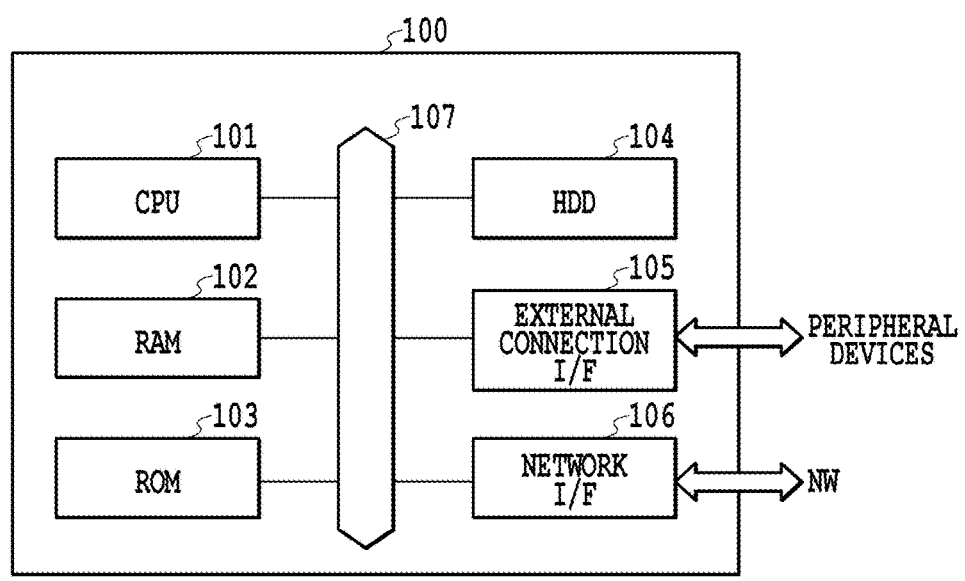
FIG. 3 is a block diagram showing an example of a hardware configuration of the communication support system according to the embodiment.

FIG. 3 is a block diagram showing an example of a hardware configuration of the communication terminal 100 according to the present embodiment. The communication terminal 100 shown in FIG. 3 includes a CPU 101, a RAM 102, a ROM 103, a hard disk drive (HDD) 104, an external connection I/F 105, and a network I/F 106. Further, these configuration units are communicatively connected to each other via a bus 107.

The CPU 101 includes an arithmetic circuit and has control over the communication terminal 100. The CPU 101 loads a program code stored in the ROM 103 into the RAM 102 and executes various kinds of processing. The ROM 103 has a function as a storage area and has various programs stored therein. The HDD 104 has a function as an auxiliary storage area and has various kinds of data stored therein.

The external connection I/F 105 is used to connect various devices to the communication terminal 100. In the present embodiment, the communication terminal 100 can be connected to the peripheral devices via the external connection I/F 105. The network I/F 106 controls input and output of data between a network NW and the communication terminal 100 based on the control by the CPU 101. It should be noted that the network I/F 106 and the network NW may be connected to each other in either a wired manner or a wireless manner.

Figure 4:
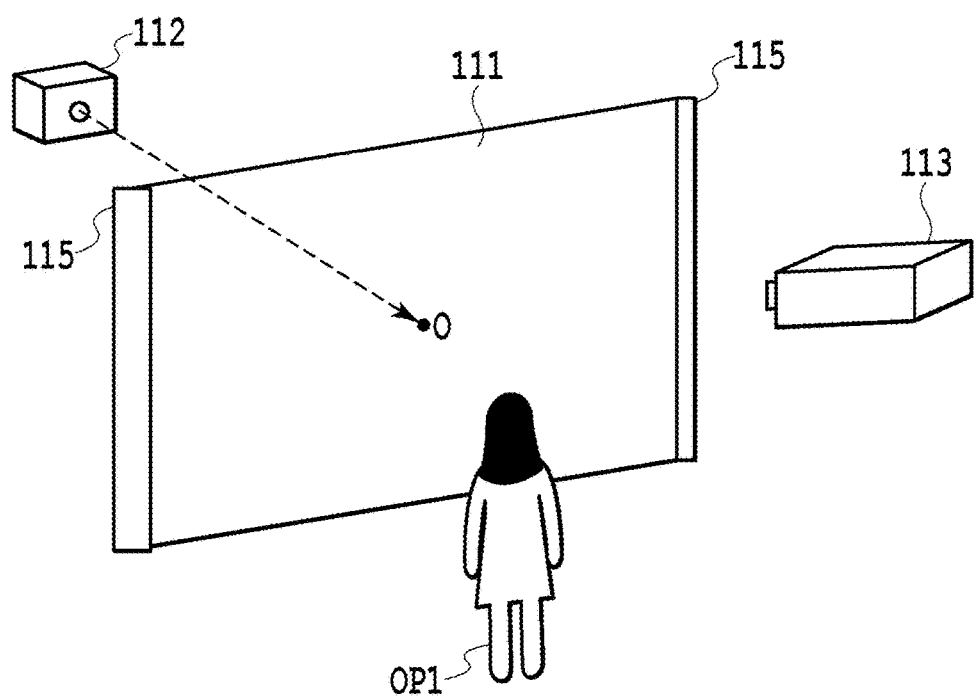
FIG. 4 is a view showing an example of a configuration of peripheral devices according to the embodiment.

FIG. 4 is a view showing an example of a configuration of the peripheral devices according to the present embodiment. As previously stated, the peripheral devices according to the present embodiment include the translucent screen 111, the camera 112, and the projector 113. Further, in the peripheral devices according to the present embodiment, a digitizer 115 is provided near the translucent screen 111. It should be noted that, in the present embodiment, a description will be given of an aspect in which a person present in front of the translucent screen 111 is an operator OP1 who stands in front of the translucent screen 111 and performs various actions in the communication support system 1.

The camera 112 is provided at the back of the translucent screen 111 as viewed from the operator OP1. The camera 112 captures an image of the operator OP1 standing in front of the translucent screen 111 and transmits the captured image to the communication terminal 100. In the present embodiment, a plurality of cameras 112 are provided for a stereoscopic view, so as to obtain a distance image including a value of a distance from the camera 112 to the operator OP1 as a subject. The camera 112 transmits the obtained distance image to the communication terminal 100 like the captured image. The communication terminal 100 obtains the captured image and the distance image from the camera 112. In a modification example, peripheral devices may be provided with a distance sensor so that a coordinate system of distance information obtained from the distance sensor and a captured image obtained by the camera 112 is geometrically transformed to associate the distance information with the captured image.

An intersection point O shows a point where a normal from the camera 112 to the translucent screen 111 crosses the translucent screen 111. The camera 112 is located so as to image the translucent screen 111, the operator OP1, and a human body part, such as a fingertip that has touched the translucent screen 111.

The projector 113 receives an output image from the communication terminal 100 and projects it on the translucent screen 111. Such a projector 113 may be regarded as a display device for displaying an image outputted from the communication terminal 100. Further, a device for displaying the output image from the communication terminal 100 may be a touchscreen display, for example.

The digitizer 115 is provided near the translucent screen 111 and has an infrared light transmitter and a receiver. In a case when the operator OP1 touches with a finger, the translucent screen 111, for example, the digitizer 115 detects positional information on a touch position based on a time until the infrared light projected from the transmitter is reflected by the finger and reaches back to the receiver. In the present embodiment, the positional information is detected as coordinate information indicating a relative position from an origin in the coordinate system of the translucent screen 111. The digitizer 115 transmits the detected coordinate information to the communication terminal 100.

Next, a description will be given of a transition from activation of the communication terminal 100 to a state in which the communication terminals in different locations become communicable with each other. The communication terminal 100 that has received an instruction to supply power from the operator OP1 loads a program stored in advance in the HDD 104 into the RAM 102 and executes the program. The communication terminal 100 reads candidates for a connection destination of a communication partner stored in advance in the HDD 104, creates a connection destination candidates screen, and transmits it to the projector 113. The projector 113 projects, on the translucent screen 111, the received connection destination candidates screen. The operator OP1 looks at the connection destination candidates screen projected on the translucent screen 111 and performs a touch action on the translucent screen 111 so as to specify a connection destination of a communication partner. It should be noted that, in the present embodiment, a connection destination is a character string or an icon that can identify a communication terminal as a connection destination candidate, and corresponds to a network identifier, such as an IP address associated with the communication terminal.

The digitizer 115 detects that the operator OP1 has touched the translucent screen 111 and transmits the detected coordinate information to the communication terminal 100. The communication terminal 100 determines a connection destination specified by the operator OP1 from the connection destination candidates screen based on the received coordinate information. The communication terminal 100 refers to the IP address of the connection destination as determined, and connects to the communication terminal 200 via the network I/F 106. Accordingly, the location A and a location B become communicable with each other, and the operator OP1 can communicate with an operator OP2 in the location B as if they are facing each other across a pane of glass under a virtual environment.

Figure 5:
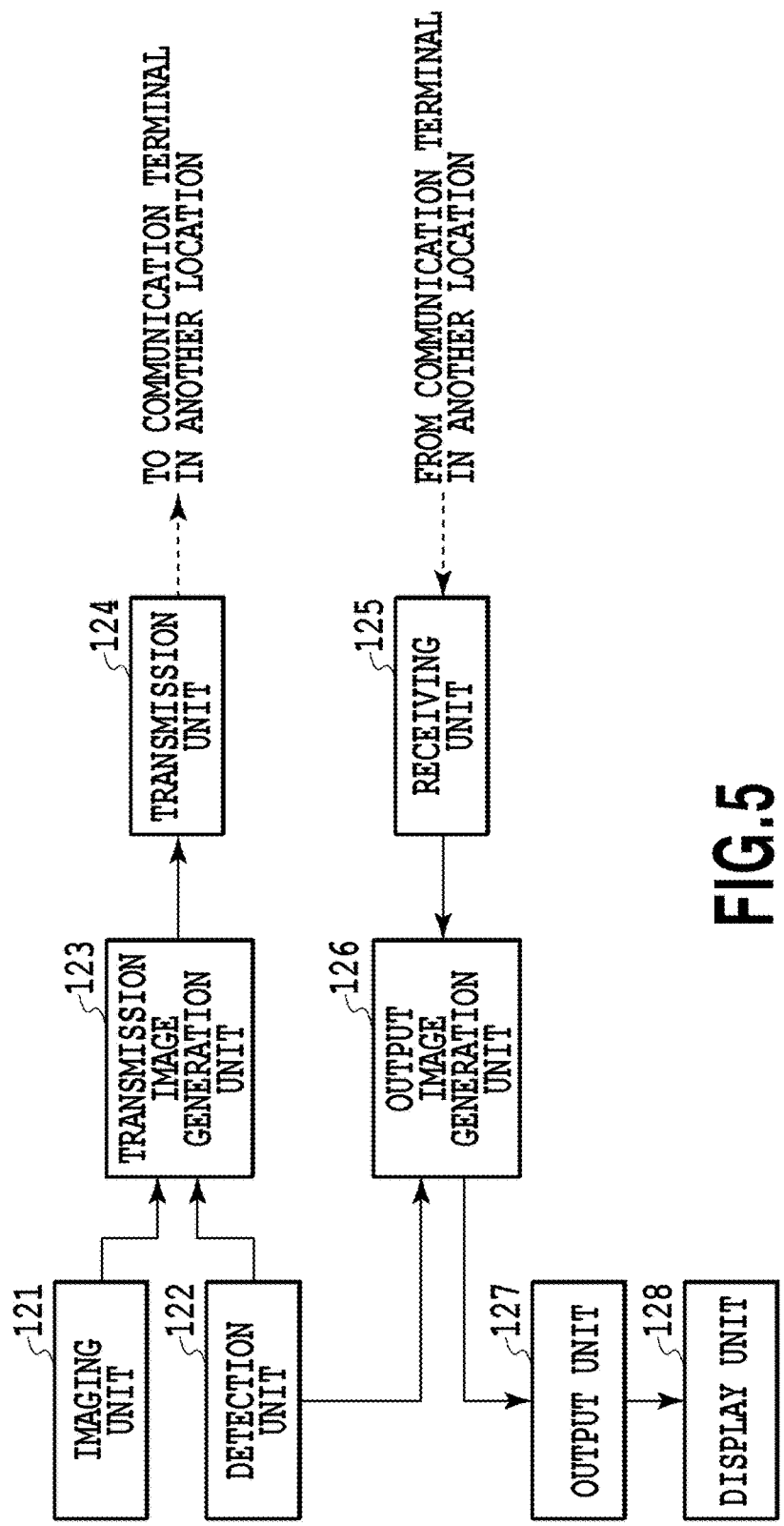
FIG. 5 is a block diagram showing a software functional configuration of a communication terminal according to the embodiment.

FIG. 5 is a block diagram showing a software functional configuration of the communication support system 1 according to the present embodiment. FIGS. 6A to 6E are views showing examples of various images controlled by the communication terminal 100. With reference to FIG. 5 and FIGS. 6A to 6E, a description will be given of transition of processing of the communication support system 1.

As shown in FIG. 5, the communication terminal 100 according to the present embodiment includes function blocks, such as an imaging unit 121, a detection unit 122, a transmission image generation unit 123, a transmission unit 124, a receiving unit 125, an output image generation unit 126, an output unit 127, and a display unit 128.

The imaging unit 121 is achieved by the camera 112 that can obtain the captured image and the distance image. The detection unit 122 is provided near the translucent screen 111 and can be achieved by the digitizer 115 that can detect coordinate information in response to an action on the translucent screen 111. Further, the transmission image generation unit 123 performs mirror-imaging processing on the captured image and the distance image captured by the imaging unit 121 to obtain a mirror-imaged captured image and a mirror-imaged distance image. The reason why the transmission image generation unit 123 performs the mirror-imaging processing is as follows. The operator OP2 in the location B views images that are mirror-imaged, and, in a case when the operator OP1 in the location A performs an action of drawing characters, such as "ABC" on the translucent screen 111, performing the mirror-imaging processing can prevent reversed characters from being displayed by the projector 213.

Next, the transmission image generation unit 123 derives, from the obtained distance image, outline information that divides a person area in which the operator OP1 is imaged from the other area. More specifically, the transmission image generation unit 123 derives a binary image obtained by binarizing the mirror-imaged distance image by using a predetermined threshold. The transmission image generation unit 123 derives, from an area having a predetermined threshold or less in the binary image, outline information that divides a person area from the other area. In this example, in a case when the operator OP1 is holding an object, such as a pointer, and a value of the distance from the camera 112 to the object is within the predetermined threshold, for example, the transmission image generation unit 123 derives outline information so that an area in which the pointer is imaged is also included in the person area.

The transmission unit 124 is achieved by the network I/F 106 and transmits the mirror-imaged captured image, the outline information, the coordinate information, and the like, to another communication terminal communicatively connected via the network NW.

The receiving unit 125 is achieved by the network I/F 106 and receives the mirror-imaged captured image, the outline information, the coordinate information, and the like, from the other communication terminal communicatively connected via the network NW.

FIG. 6B is a view showing an example of a captured image 620 that is mirror-imaged and received from the communication terminal 200 according to the present embodiment. As shown in FIG. 6B, the captured image 620 includes the operator OP2 in the location B and the window W that is part of the background of the location B. It should be noted that, in the present embodiment, a description will be given of an aspect in which the communication terminal 100 receives the mirror-imaged captured image 620, but the embodiment should not be limited to this. In another embodiment, the communication terminal 100 may receive a captured image and a distance image that are not mirror-imaged and perform mirror-imaging processing on each of the received images.

The operator OP1 can select a reference image from a reference image selection screen (not shown) on a graphical user interface (hereafter referred to as a "GUI") displayed on the translucent screen 111. Once a touch action from the operator OP1 is received, the output image generation unit 126 selects a reference image according to coordinate information detected by the detection unit 122. The output image generation unit 126 reads the selected reference image from the HDD 104 and determines a reference image display position on which the reference image is displayed. The reference image display position is specified by an offset value from the origin in the coordinate system of the desktop image 610. To display the reference image also on the display unit in the location B, the transmission unit 124 transmits, to the communication terminal 200, the same reference image and the same reference image display position as those generated by the output image generation unit 126.

FIG. 6C is a view showing an example of a reference image 630 read from the HDD 104 by the output image generation unit 126 according to the present embodiment. In this example, the reference image 630, including a plurality of line graphs that is an image of an electronic material, is shown as an example, but the present embodiment should not be limited to this. Various kinds of images, such as a document image, including a sentence and a photography image including a photograph, may be used as the reference image 630.

Next, the output image generation unit 126 generates a trajectory image representing contents of the actions by the operators OP1 and OP2 based on the coordinate information detected by the detection unit 122 and the coordinate information received from the communication terminal 200.

FIG. 6D is a view showing an example of a trajectory image 640 generated by the output image generation unit 126 according to the present embodiment. In this example, the trajectory image 640 includes trajectories of "arrows" drawn on the translucent screen 111 by the operator OP2 to point to specific portions of the line graph in the reference image. In the present embodiment, the output image generation unit 126 generates the trajectory image 640 such that a trajectory portion is opaque and an area other than the trajectory portion is transparent.

Next, the output image generation unit 126 generates an output image obtained by superposing the desktop image 610, the captured image 620, the reference image 630, and the trajectory image 640. FIG. 6E is a view showing an example of an output image 650 generated by the output image generation unit 126 according to the present embodiment. In the present embodiment, the desktop image 610, the captured image 620, the reference image 630, and the trajectory image 640 can be individually operated as layer images. Further, the desktop image 610, the captured image 620, and the trajectory image 640 are configured to have the same number of pixels in width and height. In the present embodiment, the output image generation unit 126 disposes the reference image 630 as an upper layer over the captured image 620 and disposes the trajectory image 640 as an upper layer over the reference image 630.

In this example, when disposing the reference image 630 as an upper layer over the captured image 620, there is a case when an area exists in which the reference image 630 overlaps with a person area of the operator OP2 in a display area of the reference image 630. For example, in a case when a specific content included in the reference image is pointed to with a human body part, such as a finger or a hand, an area of the human body part, such as a finger and a hand, is hidden behind the reference image 630, because the reference image 630 is disposed as an upper layer over the captured image 620. Accordingly, in the present embodiment, the output image generation unit 126 performs visualization processing on a human body part area 651 in which the reference image 630 overlaps with the person area in the display area of the reference image 630. More specifically, the output image generation unit 126 first specifies the person area in which the operator OP2 is imaged in the captured image based on the outline information. Then, the output image generation unit 126 performs visualization processing on the human body part area including the person area within the display area of the reference image 630. At the same time, invisualization processing, such as transparentizing processing, is performed on an area except the human body part area, because visibility does not need to be ensured for the window W in the background within the display area of the reference image 630.

As a result of the visualization processing, as shown in FIG. 6E, the output image 650 is generated such that the human body part area 651 within the display area of the reference image 630 is outputted translucently and the window W is hidden behind the reference image 630.

The display unit 128 is achieved by the projector 113. The projector 113 obtains the output image 650 via the output unit 127 and projects the obtained output image 650 on the translucent screen 111.

As shown in FIG. 6E, the output image 650 has an improved visibility of the operation of the operator OP2 without losing visibility of the content of the reference image 630. Therefore, the operator OP1 in the location A can perform accurate communication with the operator OP2 in the location B by referring to the operation of the operator OP2 and the content of the reference image 630.

Figure 7:
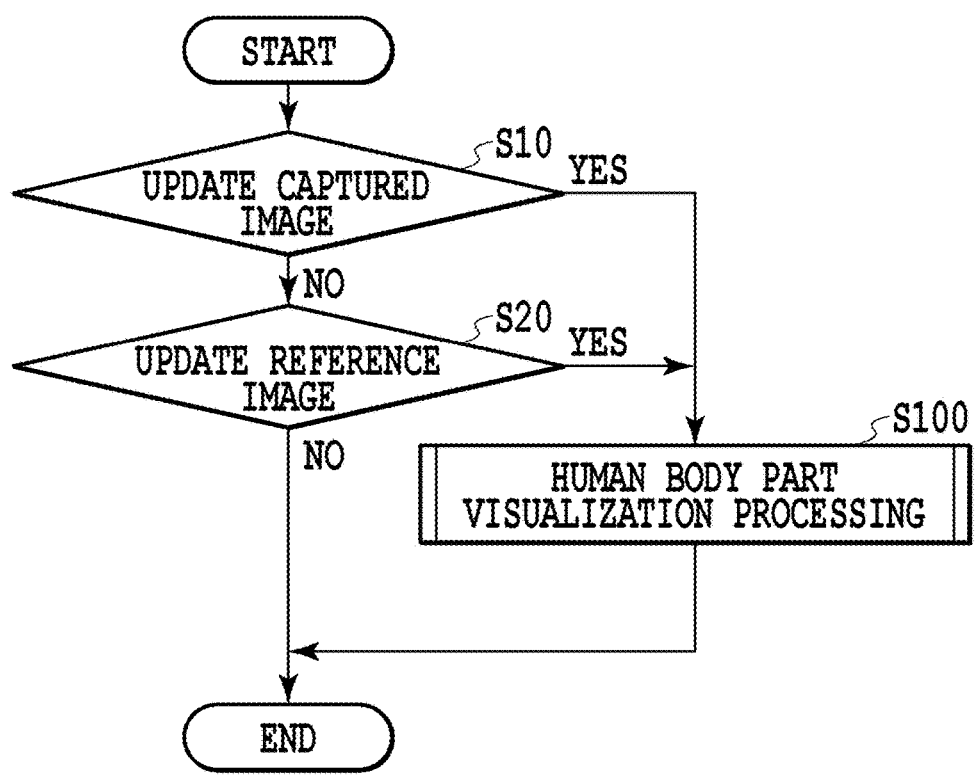
FIG. 7 is a flow chart showing a content of human body part visualization processing according to the embodiment.

FIG. 7 is a flow chart showing a content of human body part visualization processing according to the present embodiment. It should be noted that the processing according to the flow chart of FIG. 7 is executed by the CPU 101 that loads a program code stored in the HDD 104 into the RAM 102.

In step S10, the output image generation unit 126 determines whether to update the captured image. The output image generation unit 126 determines to update the captured image if the captured image and the outline information are received from the communication terminal 200 (S10: Yes), stores the received captured image and outline information in the RAM 102, and proceeds to step S100. Meanwhile, the output image generation unit 126 determines not to update the captured image if the captured image and the outline information have not been received from the communication terminal 200 (S10: No), and proceeds to step S20.

In step S20, the output image generation unit 126 determines whether to update the reference image. The output image generation unit 126 determines to update the reference image if a touch action on each GUI displayed on the translucent screen 111 is detected, and an instruction such as reading, displaying, hiding, moving, scaling, turning of a page, and the like, of the reference image is received. The output image generation unit 126 determines to update the reference image also when the reference image or the reference image display position is received from the communication terminal 200. If the reference image is determined to be updated (S20: Yes), the output image generation unit 126 updates the reference image and the reference image display position, and stores them in the RAM 102. The transmission unit 124 transmits, to the communication terminal 200, the updated reference image and reference image display position. After the transmission, the process proceeds to step S100. If the reference image is determined not to be updated (S20: No), the processing in the flow chart of FIG. 7 is finished.

In step S100, the output image generation unit 126 reads from the RAM 102 the captured image, the outline information, the reference image, and the reference image display position and performs human body part visualization processing. The processing content in step S100 will be described later in detail.

Figure 8:
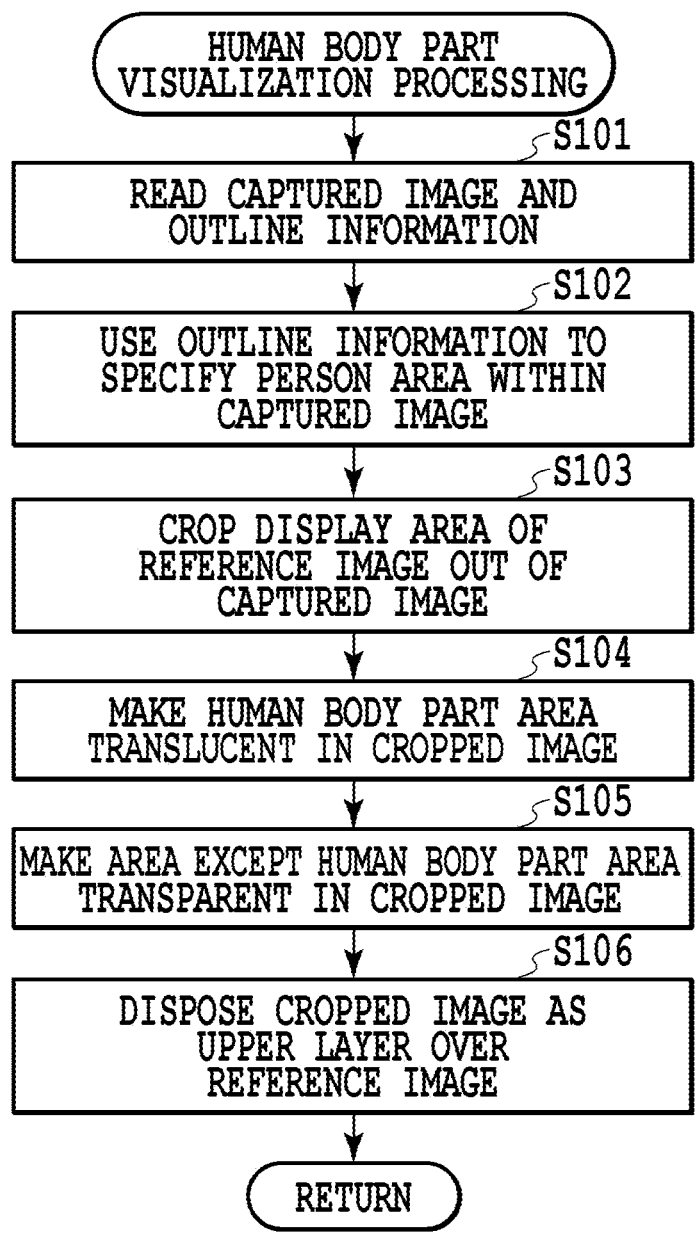
FIG. 8 is a flow chart showing a content of human body part visualization processing according to the embodiment.

FIG. 8 is a flow chart explaining a content of the human body part visualization processing (S100) of the output image generation unit 126 according to the embodiment. A description will be given of a processing content of the human body part visualization processing (S100) with reference to FIG. 8. It should be noted that the processing according to the flow chart of FIG. 8 is executed by the CPU 101 that loads a program code stored in the HDD 104 into the RAM 102.

In step S101, the output image generation unit 126 reads from the RAM 102 the captured image 620 and the outline information received from the communication terminal 200.

In step S102, the output image generation unit 126 uses the outline information to specify a person area in which the operator OP2 is imaged within the captured image 620.

In step S103, the output image generation unit 126 obtains a cropped image 900 obtained by cropping the display area of the reference image 630 out of the captured image 620.

In step S104, the output image generation unit 126 performs semi-transparentizing processing on a human body part area 901 in the cropped image 900 to have a predetermined transparency. As previously stated, the human body part area 901 refers to an area in which the reference image 630 overlaps with the person area of the operator OP2 in the display area of the reference image 630. The output image generation unit 126 performs the semi-transparentizing processing on the human body part area 901 which is to be processed.

In step S105, the output image generation unit 126 performs transparentizing processing on an area 902 except the human body part area in the cropped image 900.

In step S106, the output image generation unit 126 disposes the cropped image 900 including the transparentized human body part area 901 as an upper layer over the reference image 630.

Figure 9:
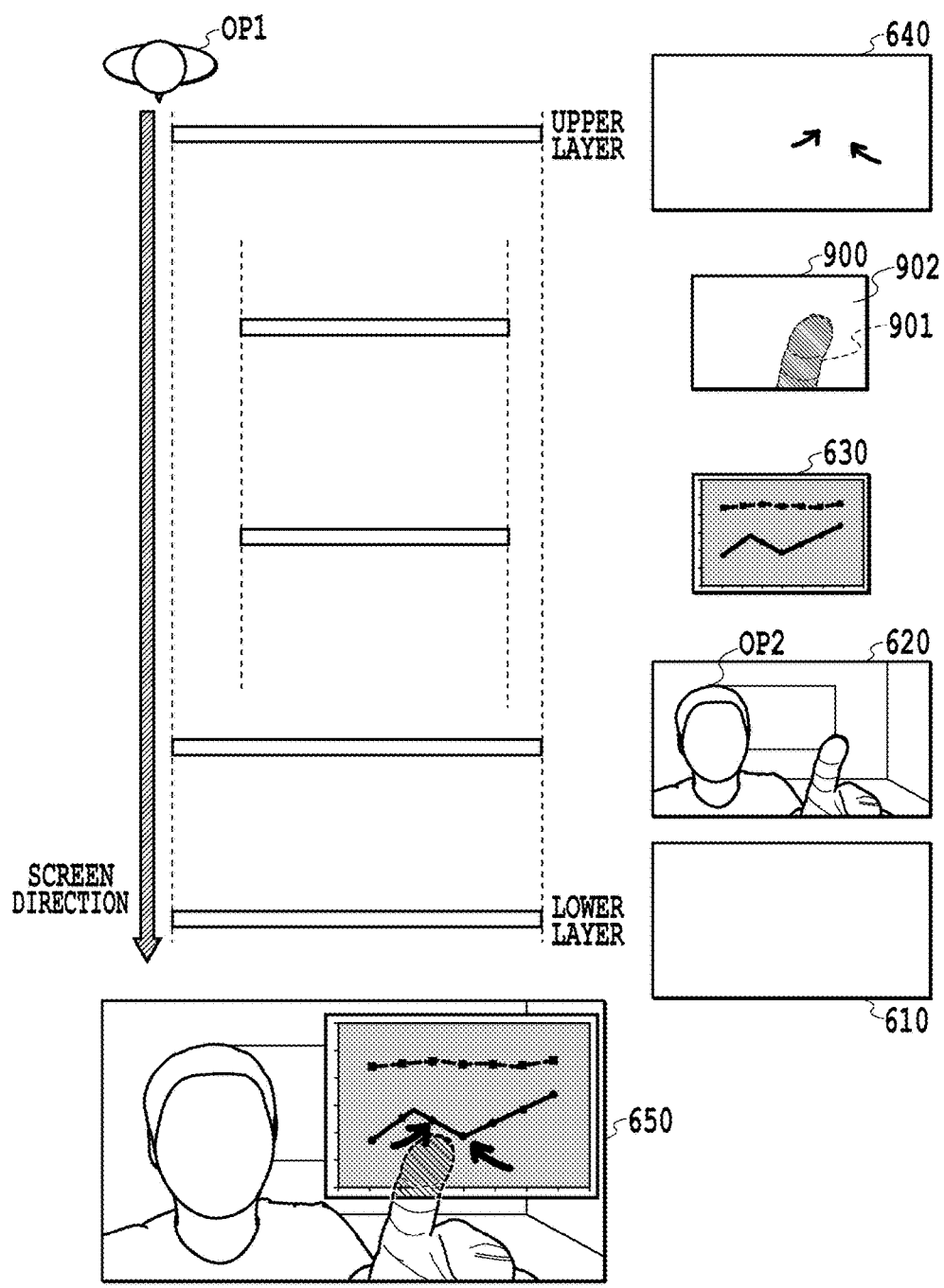
FIG. 9 is a view showing an example of a layer configuration of the output image according to the embodiment.

FIG. 9 is a view showing an example of a layer configuration of the output image 650 according to the present embodiment. The desktop image 610 consists of the same number of pixels in width and height as that of the captured image 620, and is disposed as the lowest layer of the output image 650. The captured image 620 is disposed as an upper layer over the desktop image 610.

The reference image 630 is disposed as an upper layer over the captured image 620. In the present embodiment, the reference image 630 consists of the number of pixels in width and height that is less than that of the captured image 620, and is arranged at any position within the display area of the captured image 620.

The cropped image 900 includes the semi-transparentized human body part area 901 and the transparentized area 902 except the human body part area, and consists of the same number of pixels in width and height as that of the reference image 630. The cropped image 900 in which the semi-transparentizing processing is performed on the human body part area 901 is disposed such that the cropped image 900 is superposed as an upper layer over the reference image 630. The trajectory image 640 consists of the same number of pixels in width and height as those of the desktop image 610 and the captured image 620, and is disposed as the uppermost layer in the layer configuration of the output image 650.

As described above, the output image generation unit 126 disposes the layer images as shown in FIG. 9 to generate the output image 650. The output image generation unit 126 can display the generated output image 650 on the display unit 128 via the output unit 127. According to such a configuration, the communication terminal 100 in the present embodiment can improve visibility of the operation by the operator OP2 without losing visibility of the content of the reference image 630 and allows accurate communication between operators in different locations.

Second Embodiment

Figure 10:
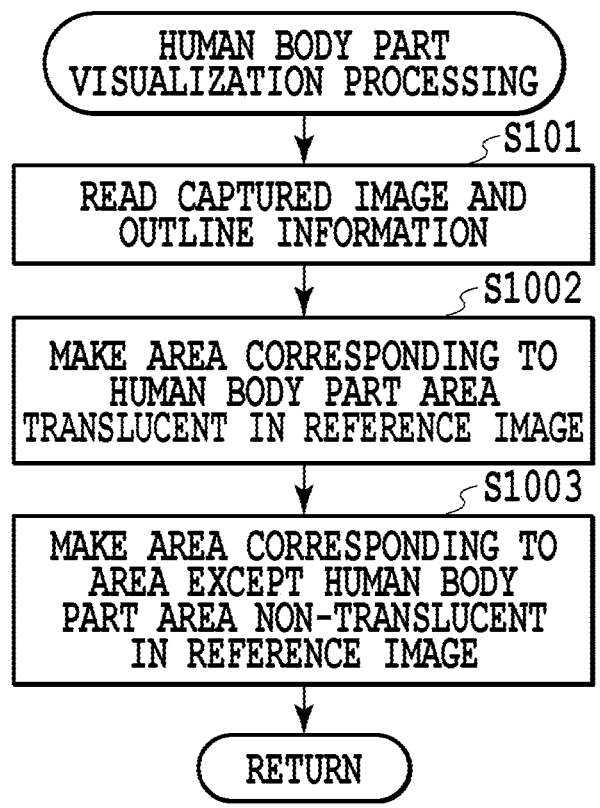
FIG. 10 is a flow chart showing a content of human body part visualization processing according to a second embodiment.

FIG. 10 is a flow chart explaining a content of the human body part visualization processing (step S100) of the output image generation unit 126 according to the present embodiment. A description will be given of a processing content of the human body part visualization processing (S100) with reference to FIG. 10. It should be noted that the processing according to the flow chart of FIG. 10 is executed by the CPU 101 that loads a program code stored in the HDD 104 into the RAM 102.

In step S101, the output image generation unit 126 reads from the RAM 102 the captured image 620 and outline information received from the communication terminal 200.

In step S1002, the output image generation unit 126 reads from the RAM 102 a reference image 1100. Then, the output image generation unit 126 performs semi-transparentizing processing on an area corresponding to a human body part area 1101 of the operator OP2 in the reference image 1100 to have a predetermined transparency.

In step S1003, the output image generation unit 126 specifies an area corresponding to an area 1102 except the human body part area of the operator OP2 in the reference image 1100, and performs non-transparentizing processing on the area.

Figure 11:
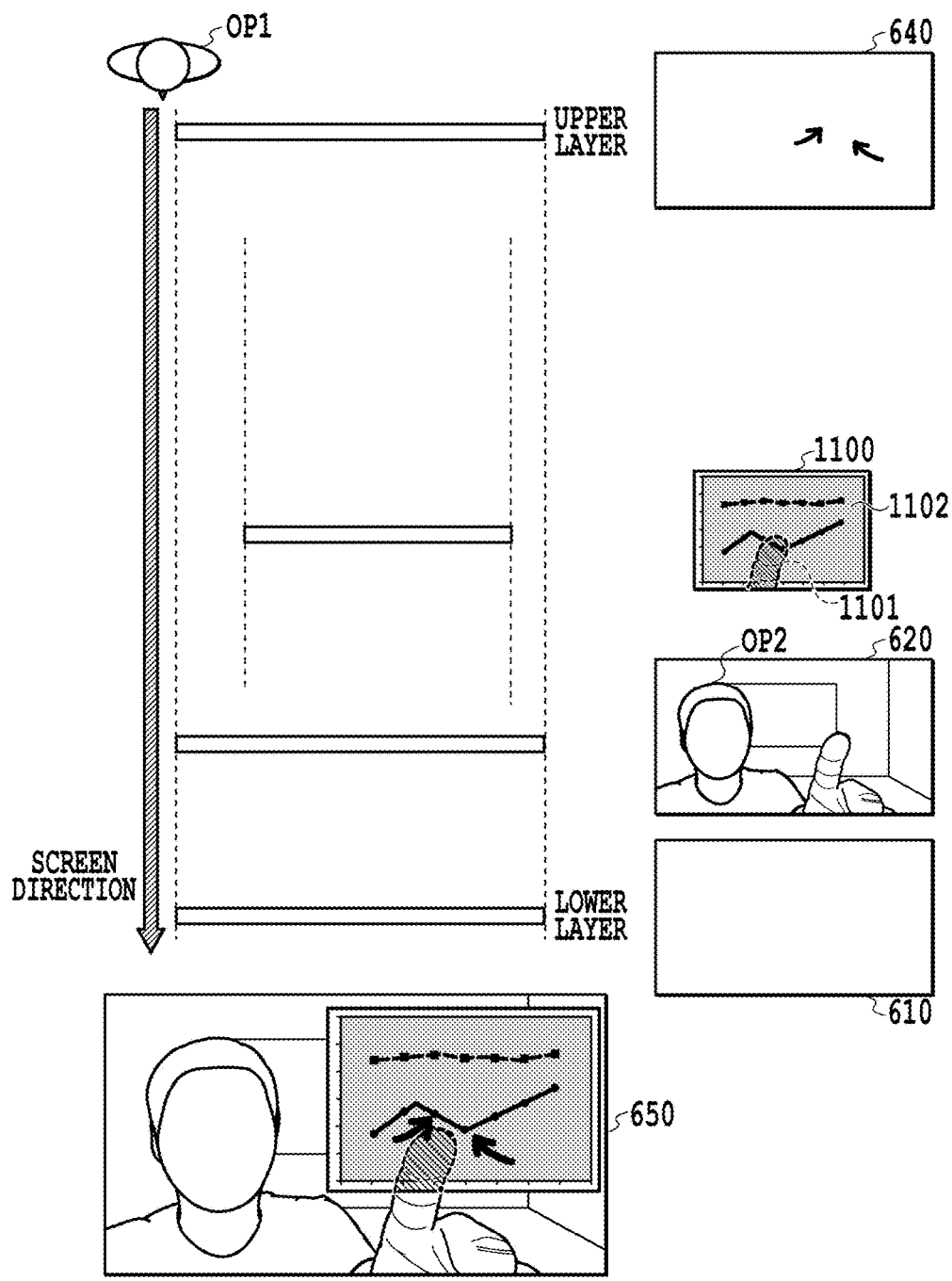
FIG. 11 is a view showing an example of a layer configuration of an output image according to the second embodiment.

FIG. 11 is a view showing an example of a layer configuration of the output image 650 according to the present embodiment. The desktop image 610 consists of the same number of pixels in width and height as that of the captured image 620, and is disposed as the lowest layer of the output image 650. The captured image 620 is disposed as an upper layer over the desktop image 610.

The reference image 1100 is disposed as an upper layer over the captured image 620. In the present embodiment, the reference image 1100 consists of the number of pixels in width and height that is less than that of the captured image 620, and is arranged at any position within the display area of the captured image 620. The trajectory image 640 consists of the same number of pixels in width and height as those of the desktop image 610 and the captured image 620, and is disposed as the uppermost layer in the layer configuration of the output image 650.

As described above, the output image generation unit 126 disposes the layer images as shown in FIG. 11 to generate the output image 650. As described above, according to the present embodiment, it is possible to generate the output image 650 including the human body part area 1101 on which visualization processing is performed without generating the cropped image 900 of the first embodiment. According to such a configuration, the communication terminal 100 in the present embodiment can improve visibility of the operation by the operator OP2 without losing visibility of the content of the reference image 630 and allows accurate communication between operators in different locations.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

The communication support system of the present invention can improve visibility of the operation by the operator without losing visibility of the content and perform accurate communication between operators in different locations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication support system comprising:
   a network interface configured to receive, via a network, a captured image obtained in another location;
   a display configured to display the captured image received by the network interface;
   a cropping unit configured, in a case when the display displays a reference image superposed as an upper layer over the captured image, to crop an image of an area having the reference image arranged therein out of the captured image;
   a specifying unit configured to specify a person area corresponding to a person within a cropped image obtained by the cropping unit; and
   a processing unit configured to make an area that is different from the person area specified by the specifying unit transparent in the cropped image,
   wherein the display displays an output image obtained by superposing the reference image as an upper layer over the captured image and further superposing the cropped image processed by the processing unit as an upper layer over the reference image,
   wherein at least one of the cropping unit, the specifying unit and the processing unit is implemented by a processor or a circuit.

2. The communication support system according to claim 1, wherein the processing unit makes the person area specified by the specifying unit translucent in the cropped image.

3. The communication support system according to claim 1, wherein the specifying unit specifies, as the person area, also an area corresponding to an object held by the person within the cropped image obtained by the cropping unit.

4. The communication support system according to claim 1,
   wherein the captured image is a distance image including a value of a distance from a camera imaging a subject to the subject, and
   wherein the specifying unit specifies the person area based on the value of the distance of the distance image.

5. The communication support system according to claim 1, further comprising an image generation unit configured to generate a trajectory image representing a content of an action by the person based on positional information detected in another location,
   wherein the display displays the output image obtained by superposing the trajectory image as an upper layer over the cropped image, and
   wherein the image generation unit is implemented by a processor or a circuit.

6. The communication support system according to claim 1, wherein the display is a projector projecting an image on a screen.

7. The communication support system according to claim 1, wherein the reference image is one of an electronic material, a document image, and a photography image.

8. An information processing apparatus constituting a communication support system comprising:
   a network interface configured to receive, via a network, a captured image obtained in another location;
   a cropping unit configured to crop an image of an area having a reference image arranged therein out of the captured image received by the network interface;
   a specifying unit configured to specify a person area corresponding to a person within the cropped image obtained by the cropping unit;
   a processing unit configured to make an area different from the person area specified by the specifying unit transparent in the cropped image; and
   an image generation unit configured to generate an output image for outputting, the output image obtained by superposing the reference image as an upper layer over the captured image and further superposing the cropped image processed by the processing unit as an upper layer over the reference image,
   wherein at least one of the cropping unit, the specifying unit, the processing unit, and the image generation unit is implemented by a processor or a circuit.

9. A control method for a communication support system, the control method comprising the steps of:
   receiving, via a network, a captured image obtained in another location;
   displaying the captured image received in the receiving step;
   cropping, in a case when a reference image is superposed and displayed as an upper layer over the captured image in the displaying step, an image of an area having the reference image arranged therein out of the captured image;
   specifying a person area corresponding to a person in a cropped image obtained in the cropping step; and
   processing to make an area that is different from the person area specified in the specifying step transparent in the cropped image, wherein, in the displaying step, an output image is displayed, the output image being obtained by superposing the reference image as an upper layer over the captured image and further superposing the cropped image processed in the processing step as an upper layer over the reference image.

10. A non-transitory computer readable storage medium storing a program for causing a computer to perform a method, the method comprising the steps of:

receiving, via a network, a captured image obtained in another location;

displaying the captured image received in the receiving step;

cropping, in a case when a reference image is superposed and displayed as an upper layer over the captured image in the displaying step, an image of an area having the reference image arranged therein out of the captured image;

specifying a person area corresponding to a person in a cropped image obtained in the cropping step; and processing to make an area that is different from the person area specified in the specifying step transparent in the cropped image, wherein, in the displaying step, an output image is displayed, the output image being obtained by superposing the reference image as an upper layer over the captured image and further superposing the cropped image processed in the processing step as an upper layer over the reference image.

* * * * *